No. 785,120.

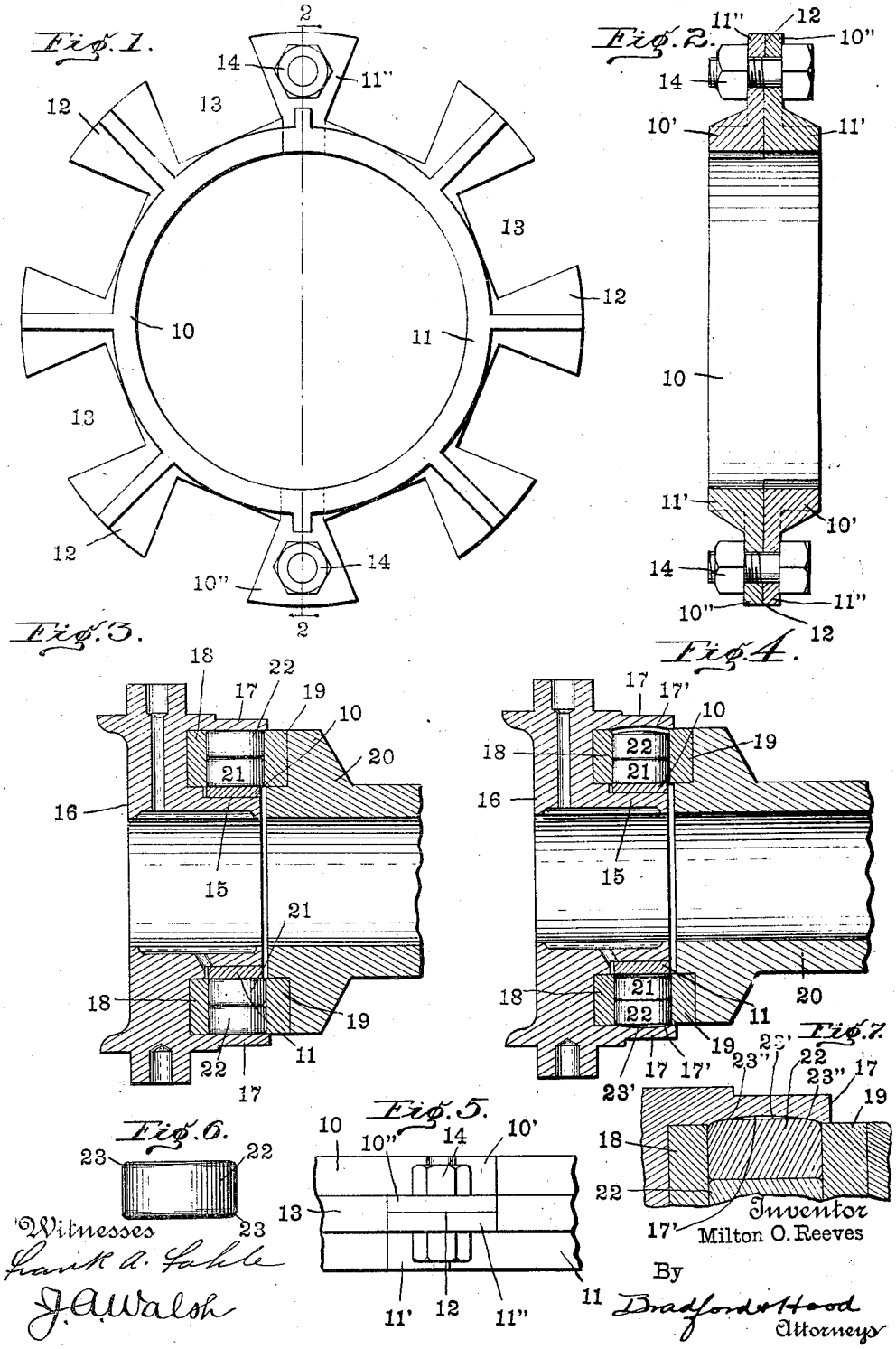

Patented March 21, 1905.

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION OF INDIANA.

ROLLER-BEARING.

SPECIFICATION forming part of Letters Patent No. 785,120, dated March 21, 1905.

Application filed December 21, 1903. Serial No. 186,124.

*To all whom it may concern:*

Be it known that I, MILTON O. REEVES, a citizen of the United States, residing at Columbus, in the county of Bartholomew and State of Indiana, have invented certain new and useful Improvements in Roller-Bearings, of which the following is a specification.

My invention relates to an improvement in thrust-bearings especially designed for, although not necessarily limited to use with, speed-varying mechanisms of a type such as is shown in Patent No. 603,067, issued April 26, 1898, to the Reeves Pulley Company, said bearing being provided for interposition between each of the cone-shaped disks and its shifting-lever.

The object of my invention is to provide a thrust-bearing in which the spider shall act as a spacer for the balls or rollers rather than as a guide, the construction being such that the outer balls or rollers engage an annular retaining-flange which in operation is engaged at all points in succession by each outer ball or roller, thus insuring the continued concentricity of the retaining member.

A further object of my invention is to provide a thrust-bearing of this type the rollers or balls of which may be readily removed from the bearing without entirely dismantling the same and the spider of which is formed in sections, so that the said sections may be removed transversely from the shaft.

The accompanying drawings illustrate my invention.

Figure 1 is a side elevation of the spider of my improved bearing; Fig. 2, a section on line 2 2 in Fig. 1; Fig. 3, an axial section of a modified form; Fig. 4, a similar section of a preferred form; Fig. 5, a plan of the adjacent ends of the two sections of the spider, and Figs. 6 and 7 side elevations of desirable forms of rollers.

In the drawings, 10 and 11 indicate a pair of semi-annular coacting spider members, each of which is provided on its periphery with a plurality of radially-projecting V-shaped spacing-fingers 12, which thus form ball or roller receiving recesses or sockets 13. The sections 10 and 11 are provided at adjacent ends with overlapping portions 10' and 11', the overlapping being made at the point of one of the ears 12, said ear being divided circumferentially, as shown in Fig. 5, into parts 10" and 11", so that a fastening-bolt 14 may be passed therethrough, thus holding the two parts of the spider together. The divided ears 12 (consisting of parts 10" and 11") are preferably considerably thinner than the width of the same web of the spider, and the bolt 14 is of a length equal to or less than the width of the main portion of the spider. The spider is sleeved upon a hub 15 of a carrier 16, which carrier is provided with an annular flange 17, which overlies the hub 15 and is adapted to project over the ears 12. Seated within the annular recess thus formed between hub 15 and sleeve 17 is a hardened bearing ring or track 18, which lies in opposition to a similar hardened bearing ring or track 19, carried by the opposing part 20. Suitable rollers are arranged in each recess 13, preferably in pairs, the inner rollers 21 having their edges barely rounded, while the outer rollers 22 have their outer edges considerably rounded, as at 23, so as to prevent any possibility of the outer rollers by reason of centrifugal action cutting into the flange 17.

In the form shown in Fig. 4 the flange 17 is provided on its inner face with a groove 17', which is a spherical segment having its center in the axis of the main driving-shaft, and in this case the rollers 21 and 22 are of such thickness that when the parts are stationary they may be withdrawn from within the flange 17. The outer rollers 22 are in this case provided with rounded ends 23', which are at their edges segments of two spheres corresponding to the curvature of the groove 17', so that when the parts are in operation these rollers will move out by centrifugal action and bear in the groove 17' at the points 23". The rollers are formed with a middle portion which is straight, so that each roller has a right-line bearing upon both tracks in order that the axes of the rollers may lie in the same plane at all times.

In operation the part 16, with its flange 17, remains stationary and part 20 is rotated, so that the rollers 21 22 have a planetary movement, carrying the spider 10 11 with them. As a consequence the rollers move within the annulus not only about their own axes, but also about the axis of the annulus, and the ends of the rollers therefore engage the entire length of the interior of the annulus progressively—that is, supposing a roller to be in engagement with the interior of the annulus at a particular point this roller will during a complete revolution of the spider about the shaft be brought into contact with every portion of the interior of the annulus and return to its starting-point. The fingers 12 do not act as retaining-guides for the rollers, but merely as spacing-fingers, and the rollers are held in proper position by sliding contact with flange 17. This sliding contact of the rollers with the flange causes a uniform wearing of the flange, so that it is always concentric with the axis of rotation, and therefore the rollers will always be properly guided and will not cut out the fingers 12. It will be apparent that the spider may be readily withdrawn from the inclosing flange 17, so that the rollers may be easily removed while the members of the spider remain together; but the operator may readily withdraw the spider segments from the shaft transversely by removing bolts 14.

I am aware that heretofore thrust-bearings have been made in which the spider has been composed of two diametrically separable parts; but in that construction these parts have been held together by an external binding-ring, which also holds the rollers within the spider; but in such construction the removal of the binding-ring in order to permit the removal of the rollers immediately causes the dismemberment of the entire structure, which is objectionable.

I claim as my invention—

1. A roller-bearing consisting of a containing annulus having a continuous concave track formed in its inner face, a spacing-spider sleeved within said annulus, rollers arranged in said spider and having convex outer ends to contact progressively with the entire length of said concave track, and suitable roller-tracks.

2. A roller-bearing consisting of, a containing annulus, a plurality of rollers arranged therein, said rollers having right-line bearing-peripheries and ends adapted to progressively engage the entire length of the interior of the annulus with at least two points of contact upon opposite sides of the axis of each roller, roller-tracks for engaging the right-line bearing-peripheries of the rollers upon opposite sides, and a spacing-spider, whereby the ends of the rollers will progressively engage the entire length of the interior of the annulus and will serve to hold the rollers radially with relation to the axis of the annulus.

In witness whereof I have hereunto set my hand and seal, at Columbus, Indiana, this 7th day of December, A. D. 1903.

MILTON O. REEVES. [L. S.]

Witnesses:
E. K. HOOD,
JNO. JEWELL.